United States Patent [19]

Kawamoto

[11] Patent Number: 5,341,434
[45] Date of Patent: Aug. 23, 1994

[54] CAR STEREO HAVING A DETACHABLE GRILLE

[75] Inventor: Masashi Kawamoto, Saitama, Japan

[73] Assignee: Pioneer Electronic Corporation, Tokyo, Japan

[21] Appl. No.: 36,728

[22] Filed: Mar. 25, 1993

[30] Foreign Application Priority Data

Apr. 16, 1992 [JP] Japan .................................. 4-122571

[51] Int. Cl.⁵ .............................................. H04B 1/00
[52] U.S. Cl. ...................................... 381/86; 455/345; 455/346; 455/348; 455/349
[58] Field of Search .............. 455/345, 346, 347, 348, 455/349; 381/86

[56] References Cited

U.S. PATENT DOCUMENTS

| 4,248,069 | 2/1981 | Burbank | 455/345 |
| 4,940,414 | 6/1990 | Lee | 455/349 |
| 5,001,779 | 3/1991 | Eggert et al. | 455/347 |

Primary Examiner—Curtis Kuntz
Assistant Examiner—Mark D. Kelly
Attorney, Agent, or Firm—Nikaido, Marmelstein, Murray & Oram

[57] ABSTRACT

A car stereo has a detachable grille attached to a body of the car stereo. A display is provided on the car stereo body for display operating modes of the car stereo. A cover is provided on the car stereo body for covering the display when the grille is detached. The cover is moved to a retracted position so as to expose the display when the grille is attached to the body.

3 Claims, 5 Drawing Sheets

CAR STEREO HAVING A DETACHABLE GRILLE

FIELD OF THE INVENTION

The present invention relates to a car stereo provided with a detachable grille.

BACKGROUND OF THE INVENTION

Increase in the use of sophisticated car stereos in recent years has caused an increase in the number of thefts of the stereos in number. In order to prevent the number of thefts of the stereo, a number of antitheft systems have been proposed. In accordance with one of the systems, a detachable grille having a plurality of push buttons for control of the stereo is attached to the body of the stereo.

FIG. 5 shows the above described prior art. The car stereo comprises a car stereo body 1 and a detachable grille 20 attached to the body 1.

A front panel 11 having a recess 11a is fixed on the outer periphery of the front portion of the car stereo body 1. The recess 11a is so dimensioned that the grille 20 snugly fits therein. At an upper central portion of the recess 11a is formed a cassette opening 12. Three push buttons 13 are provided on the opposite sides of the cassette opening 12. A connector 14 which is connected to a connector 29 (FIG. 6) provided at the back of the grille 20 when the grille is attached, is formed on the panel 11. A volume control knob 15 is provided on the front panel 11 adjacent to the recess 11a.

The grille 20 has a cassette opening 21 which coincides with the cassette opening 12 of the body 1 and push buttons 22 provided on opposite sides of the cassette opening 21 corresponding to the push buttons 13 of the body 1 for operating a cassette tape. At a lower portion of the opening 21, six preset switches 23 are provided for setting a frequency of, for example, FM channels and for displaying one of the set frequencies. Function switches 24, time adjusting switches 25 and a display exchange switch 26 are provided at a lower portion of the preset switches 23. A liquid crystal display panel 27 is disposed on a right side of the grille 20 for displaying an operation mode of the car stereo.

In order to operate the car stereo, each of the stereo body 1 and the grille 20 has a control system as shown in FIG. 6. The control system for the grille 20 comprises a microcomputer 31, a key code producing circuit 33 connected with the operation switches 23 to 26 so as to transmit a key code in accordance with the operation of the switches, a display driver 30 operated by the microcomputer 31 for driving the liquid crystal display panel 27, a lighting lamp 32, and the connector 29. The control system for the stereo body 1 comprises a microcomputer 2 for controlling various operation modes of the car stereo, a 5V supply circuit 3 for supplying the voltage of 5V to the microcomputer 2, an 8V supply circuit 5, a protection circuit 4, and the connector 14.

The connector 14 of the body has a 5V supply terminal 14a, data output terminal 14b, data input terminal 14c, key code input terminal 14d and 8V supply terminal 14e. The terminals 14a and 14e are connected to the 5V supply circuit 3 and the 8V supply circuit 5, respectively, through the protection circuit 4. The data output and input terminals 14b and 14c are connected to the microcomputer 2. The microcomputer 2 is connected to the protection circuit 4 so as to operate the circuit. When the grille 20 is detached, the protection circuit 4 stops the supply of voltage from the 5V supply circuit 3 and 8V supply circuit 5 to the terminals 14a and 14e. Thus, the car stereo circuitry provided in the body 1 is protected from damage which is caused by the short-circuiting of the exposed terminals 14a to 14e.

The connector 29 of the grille 20 has terminals which correspond to the terminals 14a to 14e of the connector 14. Namely, there is provided a 5V input terminal 29a, data input terminal 29b, data output terminal 29c, key code output terminal 29d, and 8V input terminal 29e. The terminal 29a is connected to the microcomputer 31 so as to supply the 5V voltage thereto. The microcomputer 31 receives data from the microcomputer 2 through the data input and output terminals 29b and 14b dependent on the operation of the operation switches 23 to 26 on the grille 20. A signal of the microcomputer 31 is applied to the microcomputer 2 through data output terminal 29c and data input terminal 14c. The microcomputer 31 applies a control signal to the display driver 30 to indicate the received data on the display 27. The 8V input terminal 29e is connected to the lamp 32 for lighting the display 27.

When the grille 20 is taken out, since only the volume control knob 15 is provided on the stereo body 1, the stereo body loses the appearance as a car stereo. Hence, if the driver takes the grille 20 with him/her when leaving the vehicle, the theft of the car stereo is prevented.

In the conventional car stereo, the control system of the grille is complicated in construction and it is necessary to provide a large number of terminals in the connector. Thus, manufacturing cost of the car stereo is prevented from being reduced.

When the grille is detached from the body, the grille may be dropped accidentally. The liquid crystal material of the display is sealed between thin sheets of transparent electrodes forming a cell. Therefore if the display is depressed by shock, the cell may be deformed.

Furthermore, if the detached grille is placed near a heat source, the cell may also be deformed.

SUMMARY OF THE INVENTION

An object of the present invention is to provide a car stereo having a detachable grille in which a liquid crystal display device is protected from potential problems and manufacturing cost is reduced.

According to the present invention, there is provided a car stereo having a detachable grille attached to a body of the car stereo, the grille having operating switches for selecting operating modes of the car stereo, the body of the car stereo having a display for displaying the operating modes, and a cover for covering the display when the grille is detached from the body and for exposing the display when the grille is attached to the body.

In an aspect of the invention, the cover serves as a shade for shading the display from the sun.

The other objects and features of this invention will become understood from the following description with reference to the accompanying drawings.

DETAILED DESCRIPTION OF THE PREFERRED EMBODIMENT

Figure 1:
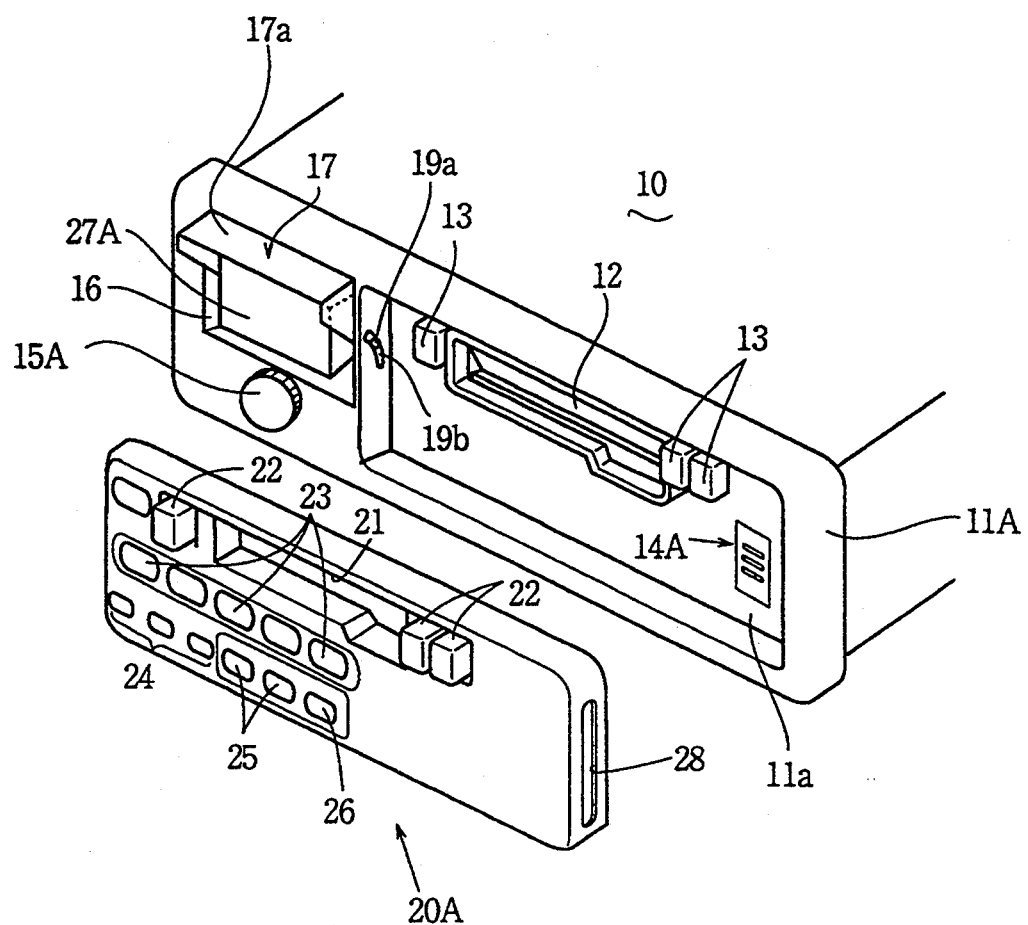
FIG. 1 is a perspective view of a car stereo having a detachable grille to which the present invention is applied, with the grille shown in a detached state.

Referring to FIG. 1, a car stereo to which the present invention is applied comprises a car stereo body 10 and a grille 20A. Structures which are the same as the conventional car stereo are identified with the same reference numerals as FIGS. 1 and 2 and the further description of the construction of the car stereo is omitted.

The stereo body 10 is provided with a front panel 11A having the recess 11a on which a connector 14A is formed corresponding to a connector 29A (FIG. 2) of the grille 20A.

A rectangular opening 16 is formed on the front panel 11A on the left of the recess 11a, and a volume control knob 15A is provided on the lower portion of the opening 16. A liquid crystal display device 27A is mounted in the opening 16. The display device 27A has a cover 17 pivotally mounted on the panel.

Figure 3:
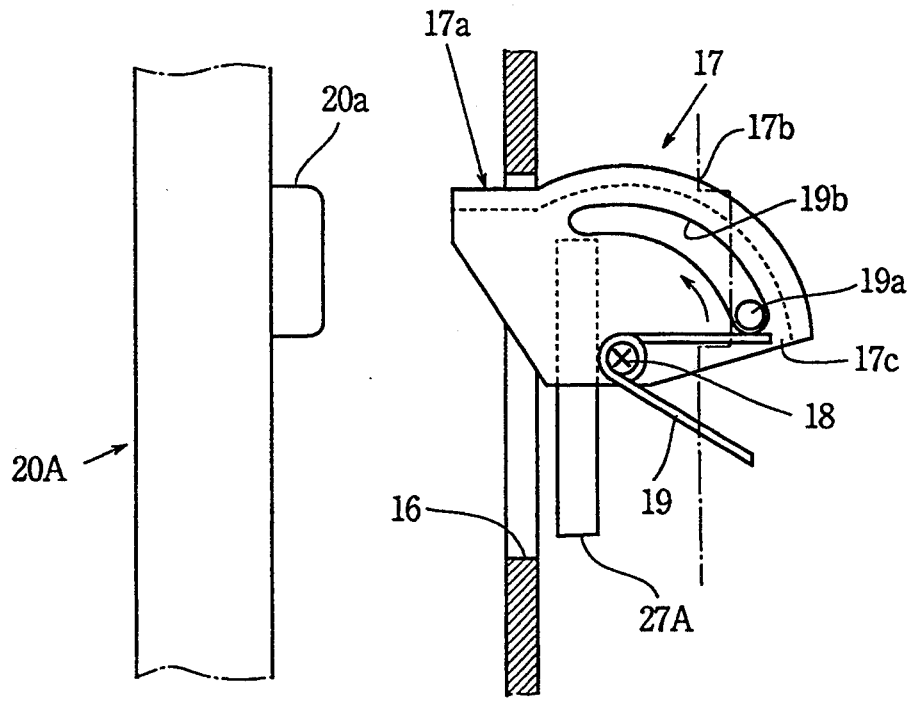
FIG. 3 is a sectional side view showing a cover for a liquid crystal display device.
Figure 4:
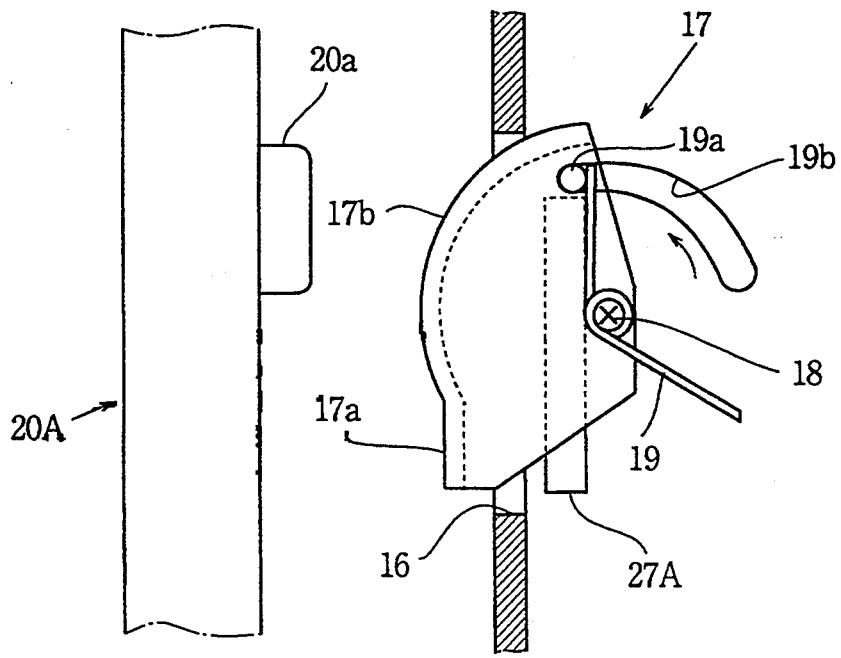
FIG. 4 is a sectional side view of the cover in a closed state.
Figure 5:
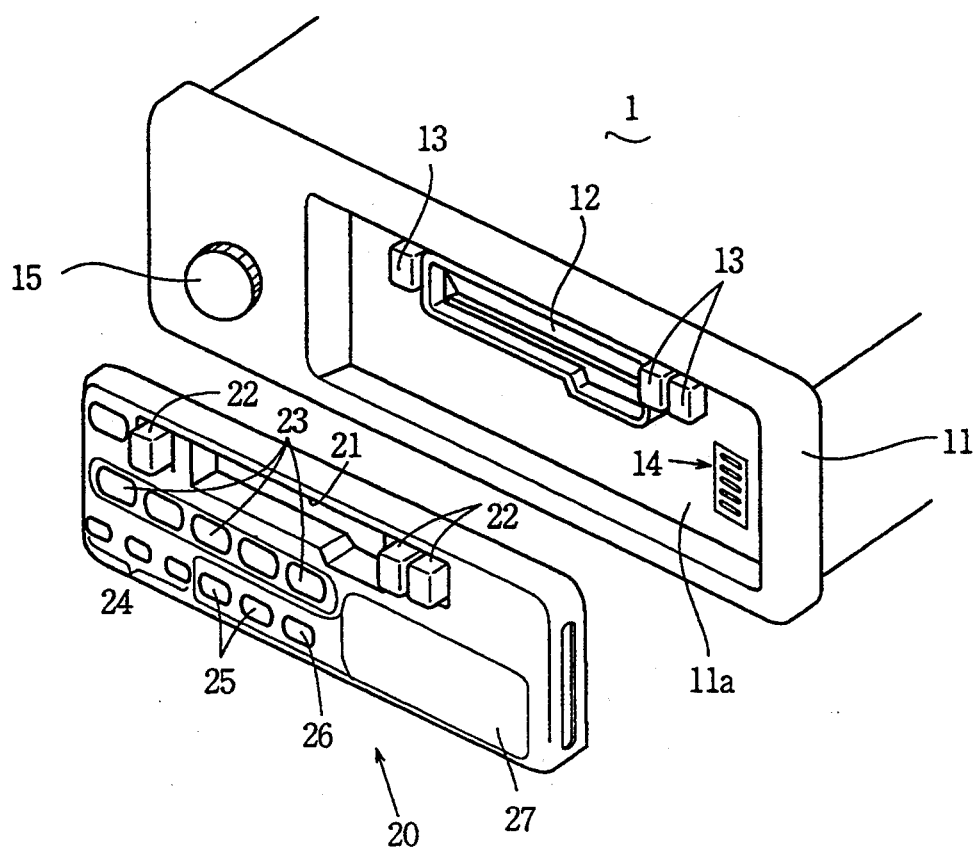
FIG. 5 is a perspective view of a conventional car stereo having a grille, shown in a detached state.
Figure 6:
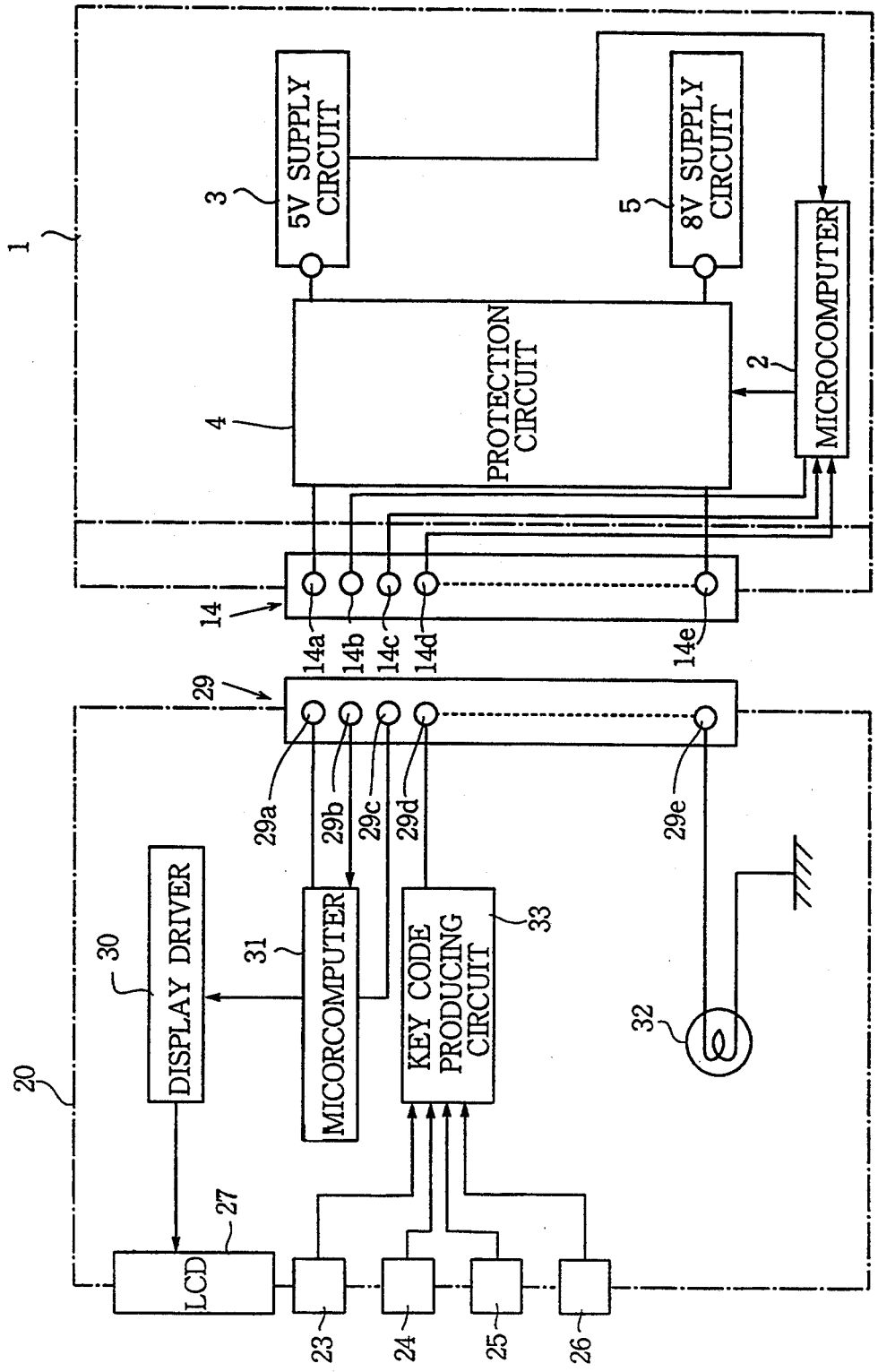
FIG. 6 is a block diagram showing a control circuit of the conventional car stereo.

Referring to FIGS. 3 and 4, the cover 17 comprises a cover plate having a front shade portion 17a and a rear spherical portion 17b, and a pair of side plates 17c provided on opposite sides of the cover plate. The side plates 17c are pivotally mounted on shafts 18 which are secured to the inside wall of the front panel 11A. The side plate 17c has a pin 19a projected from a slit 19b having a crescent shape formed on a side wall of the recess 11a as shown in FIG. 1. A spring 19 is provided on the shaft 18 and an end thereof is abutted on the lower portion of the pin 19a so that the pin 19a is outwardly urged as shown by an arrow.

The grille 20A has a projection 20a provided on a side frame of the back thereof to be engaged with the pin 19a when the grille is inserted into the recess 11a.

As shown in FIG. 4, when the grille 20A is removed, the pin 19a is outwardly moved in the slit 19b by the spring 19, so that the spherical portion 17b of the cover 17 is exposed from the opening 16 to cover the liquid crystal display device 27A completely.

Figure 2:
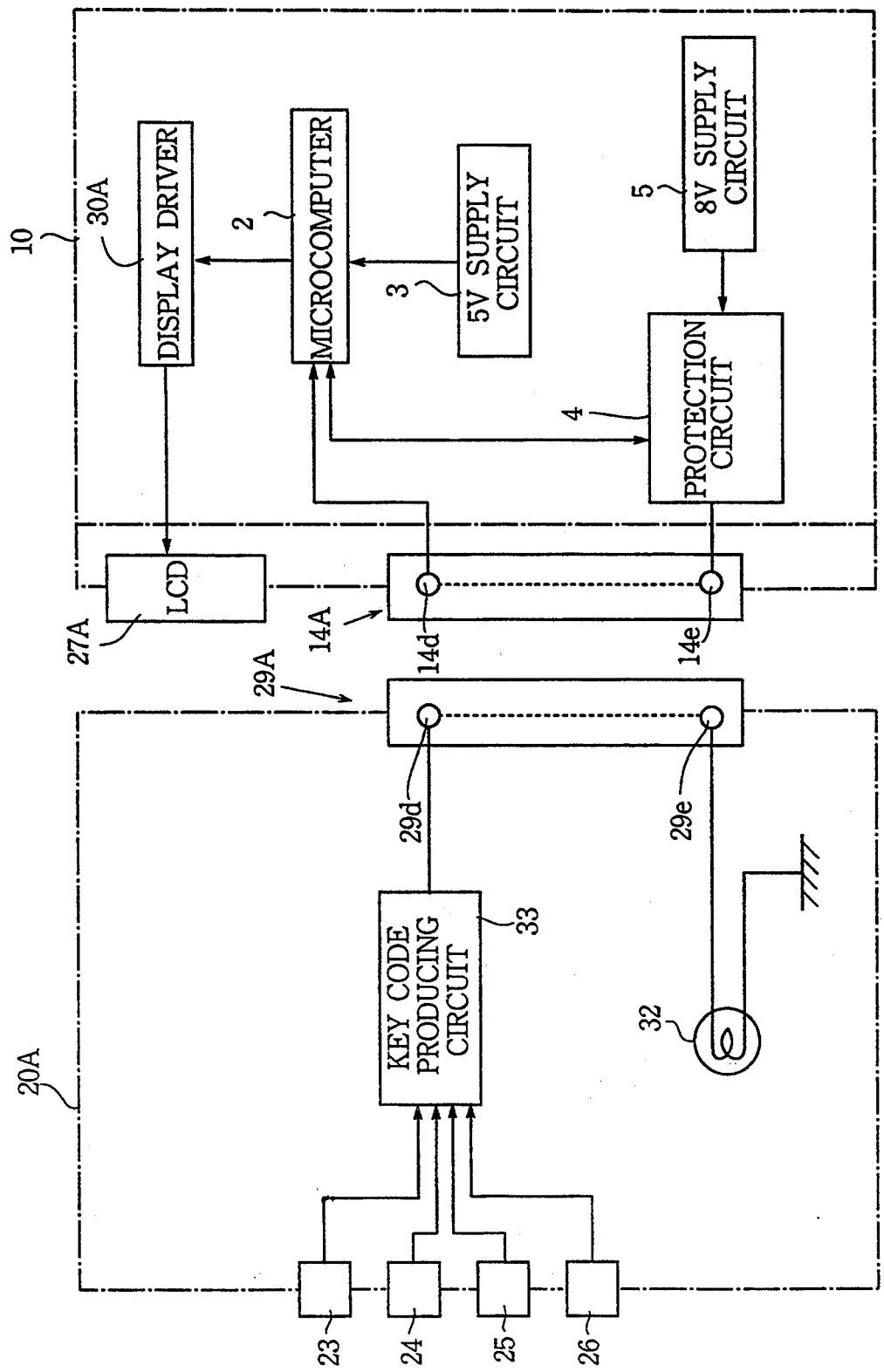
FIG. 2 is a block diagram of a control system provided in a stereo body and a grille of the car stereo.

Referring to FIG. 2, a control system of the stereo body 10 comprises a display driver 30A applied with a control signal from the microcomputer 2 for driving the liquid crystal display device 27A. The microcomputer 2 is connected to the 5V supply circuit 3 and the protection circuit 4. The connector 14A has the key code input terminal 14d connected to the microcomputer 2, and the 8V output terminal 14e connected to the 8V supply circuit 5 through the protection circuit 4. A control system of the grille 20A comprises the key code producing circuit 33, the lamp 32, and the connector 29 having the key code output terminal 29d and 8V input terminal 29e.

Referring back to FIG. 1, in order to attach the grille 20A on the body 10, a groove 28 formed in one side of the grille 20A is engaged with a projection (not shown) projecting into the recess 11a of the front panel 11A from an inner edge thereof, thereby positioning the grille 20A. The grille 20A is pushed to be pivoted about the projection so as to close in on the panel 11A, so that an engaging member of a push-push mechanism (not shown) provided in the body 10 engages with a recess (not shown) formed at the inner corner of the other side of the grille 20A. Thus the grille 20A fits in the recess 11a of the panel 11.

On the other hand, the projection 20a of the grille 20A pushes the pin 19a of the cover 17 inwardly so that the pin 19a slides in the slit 19b to rotate the cover 17 about the shafts 18. Thus, the cover 17 is retracted in the front panel 11A. When the grill 20A is completely mounted on the recess 11a, the pin 19a engages with an innermost end of the slit 19b. In this state, the front portion 17a is projected from the opening 16 to shade the liquid crystal display device 27A from the sun.

If the grille 20A is forcibly depressed, the lock mechanism is released, so that the grille 20A can be removed from the body 10.

In order to detach the grille 20A from the panel 11A, the grille 20A at the side having the inner recess is depressed. The push-push mechanism is accordingly operated to project the engaging member. The grille 20A is pivoted about the projection and pulled off the panel 11A of the body 10.

In this state, the projection 20a is disengaged from the pin 19a so that the pin 19a is urged by the spring 19 to be slid in the slit 19b outwardly. The cover 17 is rotated about the shafts 18 to expose the spherical portion 17b. Thus, the liquid crystal display device 27A is covered by the cover 17.

The pin 19a may be rotatably mounted on the side plate 17c so that friction of the spring 19 on the pin 19a is reduced, thereby smoothly rotating the cover 17.

When the grille 20A is taken out, the liquid crystal display device 27A on the front panel 11A is covered by the cover 17 and only the knob 15A remains on the panel 11A. Thus, the stereo body 10 loses the appearance as a car stereo. Hence, if the driver takes the grille 20A with him/her when leaving the vehicle, the theft of the car stereo is prevented.

The operation of the control system is described hereinafter. When the grille 20A is attached to the body 10, the terminals 29d and 29e are connected to the terminals 14d and 14e of the connector 14A on the body 10, respectively. The lamp 32 is supplied with the voltage of 8V from the 8V supply circuit 5 so as to be lighted.

When one of the operation switches 23 to 26 is operated, the key code producing circuit 33 produces a key code signal which is applied to the microcomputer 2 through the terminals 29d and 14d. Thus, the microcomputer 2 operates the driver 30A to drive the display device 27A.

In accordance with the present invention, the liquid crystal display device and the display driver are provided in the car stereo body and operated by the microcomputer mounted in the body. Therefore, the microcomputer provided in the grille and the corresponding terminals of the connector are omitted. Thus, the construction of the control system is simplified to reduce the manufacturing cost.

Furthermore, problems of the liquid crystal display device caused by shock and heat are eliminated.

Since the cover is mounted on the liquid crystal display device for covering the display device when the grille is detached, the stereo body loses the appearance as a car stereo. The cover also serves as a shade for protecting the display device from the sun. Thus, the information indicated on the display is clearly imaged, and the display device is protected from the heat of the sun.

While the presently preferred embodiment of the present invention have been shown and described, it is to be understood that this disclosure is for the purpose of illustration and that various changes and modifications may be made without departing from the scope of the invention as set forth in the appended claims.

What is claimed is:

1. A car stereo having a detachable grille attached to a body of the car stereo, the grille having operating switches for selecting operating modes of the car stereo, comprising:

a display provided on the car stereo body for display the operating modes;

a cover provided on the car stereo body for covering the display; and actuating means for moving the cover to a projected position so as to cover the display in response to movement of the grille in a detaching direction and for moving the cover to a retracted position so as to expose the display in response to movement of the grille in a attaching direction to the car stereo body.

2. The car stereo according to claim 1 wherein the cover has a shade portion for shading the display when the grille is attached.

3. The car stereo according to claim 1 wherein
   the actuating means comprises a spring for urging the cover to the projected position, and a projection formed on the grille so as to move the cover to the retracted position when the grille is attached.

* * * * *